(12) United States Patent
Shibuya et al.

(10) Patent No.: US 7,570,412 B2
(45) Date of Patent: Aug. 4, 2009

(54) REVERSIBLE RECORDING MATERIAL AND DISPLAYING ELEMENT

(75) Inventors: Takeshi Shibuya, Kanagawa (JP); Shigenobu Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 11/935,674

(22) Filed: Nov. 6, 2007

(65) Prior Publication Data

US 2008/0112033 A1    May 15, 2008

(30) Foreign Application Priority Data

Nov. 10, 2006    (JP)   ............... 2006-305149

(51) Int. Cl.
*G02F 1/15* (2006.01)
*G02F 1/153* (2006.01)

(52) U.S. Cl. .................. 359/265; 359/900; 359/270

(58) Field of Classification Search ......... 359/265–275, 359/900; 427/126.3; 548/217
See application file for complete search history.

(56) References Cited

U.S. PATENT DOCUMENTS 6,639,039 B1    10/2003    Fries et al.

FOREIGN PATENT DOCUMENTS

| EP | 1 443 090 A1 | 8/2004 |
|---|---|---|
| JP | 60-24829 | 6/1985 |
| JP | 2000-506629 | 5/2000 |
| JP | 2002-59651 | 2/2002 |
| JP | 2006-235366 | 9/2006 |
| WO | WO 97/35227 | 9/1997 |

OTHER PUBLICATIONS

N. Sertova, et al., "Photochromism of styryl cyanine dyes in solution", Journal of Photochemistry and Photobiology A: Chemistry, vol. 112, 1998, pp. 187-190, XP002477033.

*Primary Examiner*—William C Choi
*Assistant Examiner*—Jack Dinh
(74) *Attorney, Agent, or Firm*—Oblon, Spivak, Maier & Neustadt, P.C.

(57) ABSTRACT

A reversible recording material is disclosed. The reversible recording material includes one or more kinds of compounds having a structure shown in Chemical Formula (1) on a surface of metal oxide particles.

(1)

[Chemical Formula (1)]

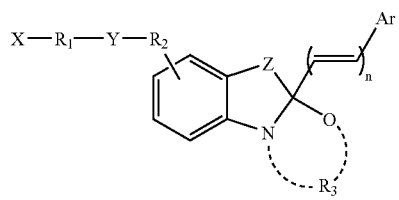

In Chemical Formula (1), X shows a linkage including an element selected from Si, Ti, and Al; Y shows a linkage including a structure selected from Chemical Formula (2); Z shows a methylene group or a sulfide group capable of having a substituent group; Ar shows an aromatic group capable of having a substituent group; $R_1$ and $R_2$ show corresponding alkylene groups; $R_3$ shows an alkylene group capable of forming a ring structure linked with —N—C—O— and able to have a substituent group; and "n" is an integer which is 1 or more.

(2)

[Chemical Formula (2)]

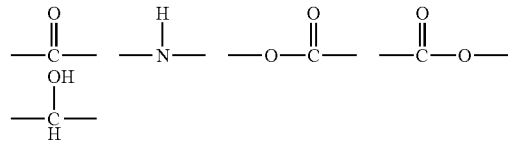

8 Claims, No Drawings

REVERSIBLE RECORDING MATERIAL AND DISPLAYING ELEMENT

BACKGROUND OF THE INVENTION

1. Field of the Invention

The present invention generally relates to a reversible recording material and an electrochromic displaying element using the reversible recording material in which color is reversibly changed by a voltage being applied from an external device. In addition, the present invention can be applied to a reflection type display and electronic paper.

2. Description of the Related Art

Recently, as a recording medium to replace paper, electronic paper has been greatly developed. When the electronic paper is compared with existing displays such as a CRT (cathode ray tube) and an LCD (liquid crystal display), the electronic paper is a flexible reflection type displaying device. Further, the electronic paper has characteristics such as high white reflectance, a high contrast ratio, high definition image displaying ability, power saving by a memory effect, thin and light-weight, and low cost.

In order to realize the electronic paper, many methods can be used, for example, an electrophoresis method or a liquid crystal using method. Of the methods, when a method is used which utilizes a chromic material, the electronic paper has high white reflectance, a high contrast ratio, and visibility near to paper. Therefore, the chromatic material utilizing method has high potential for realizing the electronic paper. The chromic materials are classified into many types depending on image forming methods. As representatives, there are an electrochromic material and an acid-based chromic material using, for example, a leuko dye. Especially, an electrochromic displaying element, which utilizes color development and color reduction of an electrochromic compound, is a reflection type displaying element, has a memory effect for power saving, and can be driven by a low voltage. Therefore, the electrochromic displaying element has been researched and developed in a range from material development to device designing, as a candidate for the electronic paper.

From a viewpoint of materials, of compounds which have a chromic phenomenon, a styryl-based pigment (compound) has high color development characteristics, and can develop various colors depending on the material structure. Therefore, the styryl-based pigment has been expected to realize a multiple color displaying element. The styryl-based compound shows characteristics such as color development and reduction by acid base, by light, and by electric oxidation reduction, and has been researched as an electrochromic material which is used for an electrochromic displaying element. However, the durability of the styryl-based compound is not sufficient and the electrochromic displaying element using a styryl-based compound has not been put into practical use (refer to Patent Document 1).

In addition, as an electronic device including electronic paper, an electrochromic device has been greatly researched in which an electrochromic material is formed on semiconductor particles. For example, in Patent Document 2, an electrochromic compound is adhered onto a nano-crystalline layer disposed on an electrode. Conventionally, similar to Patent Document 2, in many cases, an acid group tail of, for example, carboxylic acid and salicylic acid of an organic functionality material is adhered onto a hydroxyl group of inorganic fine particles. When the acid group tail is used, an organic compound can be adhered onto the hydroxyl group of the inorganic fine particles. However, since the bonding force between them is not sufficient, while the device is being manufactured, after the formed device is repeatedly used, or under alkaline conditions, the bonding between the organic compound and the inorganic fine particles is easily broken.

[Patent Document 1] Japanese Patent No. 60-024829

[Patent Document 2] Japanese Translations of PCT International Publication No. 2000-506629

SUMMARY OF THE INVENTION

In a preferred embodiment of the present invention, there is provided a reversible recording material having high color development characteristics and high durability and a displaying element using the reversible recording material.

Features and advantages of the present invention are set forth in the description that follows, and in part will become apparent from the description, or may be learned by practice of the invention according to the teachings provided in the description. Features and advantages of the present invention will be realized and attained by a reversible recording material and a displaying element using the reversible recording material particularly pointed out in the specification in such full, clear, concise, and exact terms so as to enable a person having ordinary skill in the art to practice the invention.

To achieve one or more of these and other advantages, according to one aspect of the present invention, there is provided a reversible recording material. The reversible recording material includes one or more kinds of compounds having a structure shown in Chemical Formula (1) on a surface of metal oxide particles.

[Chemical Formula (1)] (1)

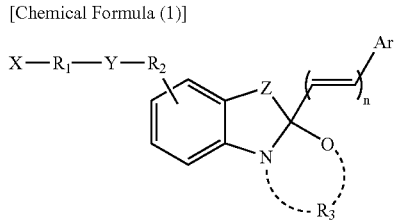

In Chemical Formula (1), X shows a linkage including an element selected from Si, Ti, and Al; Y shows a linkage including a structure selected from Chemical Formula (2); Z shows a linkage of a methylene group or a sulfide group capable of having a substituent group; Ar shows an aromatic group capable of having a substituent group; $R_1$ and $R_2$ show corresponding alkylene groups; $R_3$ shows an alkylene group capable of forming a ring structure linked with —N—C—O— and able to have a substituent group; and "n" is an integer which is 1 or more.

(2)

[Chemical Formula (2)]

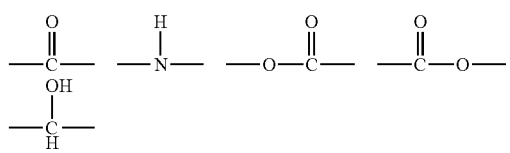

Effect of the Invention

According to an embodiment of the present invention, a reversible recording material having high color development characteristics and high durability can be realized. In addition, a displaying element using the reversible recording material can be realized.

In addition, a reversible recording material having high color development characteristics and high durability can be manufactured by a simplified method. In addition, a displaying element using the reversible recording material can be manufactured by a simplified method.

BRIEF DESCRIPTION OF THE DRAWINGS

No drawings.

DESCRIPTION OF THE PREFERRED EMBODIMENTS

Best Mode of Carrying Out the Invention

The best mode of carrying out the present invention is described.

[Reversible Recording Material]

First, a reversible recording material according to embodiments of the present invention is described.

A reversible recording material according to embodiments of the present invention includes one or more kinds of compounds having a structure shown in Chemical Formula (1) on a surface of metal oxide particles.

[Chemical Formula (1)]

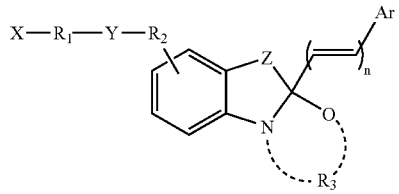

(1)

In Chemical Formula (1), X shows a linkage including an element selected from Si, Ti, and Al, and Y shows a linkage including a structure selected from Chemical Formula (2) (described below). Z shows a linkage of a methylene group or a sulfide group and can have a substituent group. Ar shows an aromatic group and can have a substituent group. $R_1$ and $R_2$ show corresponding alkylene groups. $R_3$ shows an alkylene group capable of forming a ring structure linked with —N—C—O— and can have a substituent group. In addition, "n" is an integer which is 1 or more.

[Chemical Formula (2)]

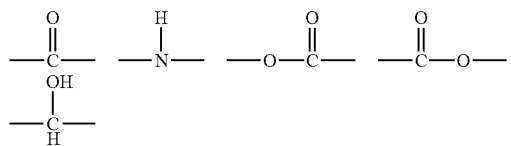

(2)

The linkage position of $R_2$ to a styryl dye is not limited to a specific position, but can be an ortho position, a meta position, or a para position to Z, and can be linked via a linkage formed of, for example, thionyl or carbonyl. In addition, a part linked between $R_2$ and X can be substituted for by 2 or more of the styryl dyes.

As described above, the structure of the linkage X can be a linkage including an element selected from Si, Ti, and Al; however, more preferably, the structure of the linkage X includes Si—O, Ti—O, or Al—O, from a viewpoint of stability and manufacturability.

The structure of the aromatic group Ar can include a substituent group. Specifically, as the aromatic group Ar, a phenyl group, a naphthyl group, or a fluorenyl group is preferably used. Especially, from the viewpoint of hue, a p-dimethylaminophenyl group or a p-methoxyphenyl group is preferably used. The "n" is preferably 1 or 2 from the viewpoint of the hue, and the hue can be changed by the "n". The alkylene groups $R_1$ and $R_2$ can include corresponding substituent groups, and can include, for example, an unsaturated bond and an ether bond. It is preferable that the alkylene group $R_3$ capable of forming the ring structure linked with —N—C—O— be one of the structures shown in Chemical Formula (5) so as to reversibly show color development and color reduction. However, the structure of the alkylene group $R_3$ is not limited to one of the structures shown in Chemical Formula (5).

[Chemical Formula (5)]

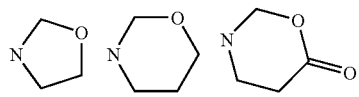

(5)

It is preferable that the structure of the linkage Z be one of the structures shown in Chemical Formula (6).

[Chemical Formula (6)]

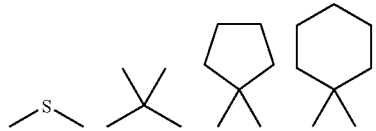

(6)

Further, preferable examples of the structure of Chemical Formula (1) are shown in Chemical Formulae (7).

[Chemical Formulae (7)]

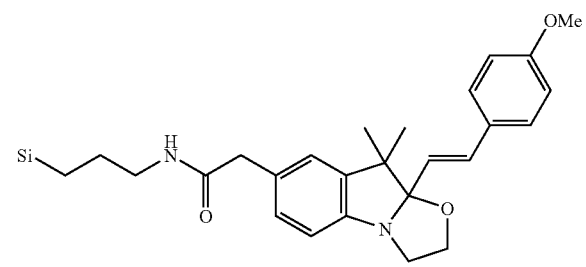

(7)

-continued
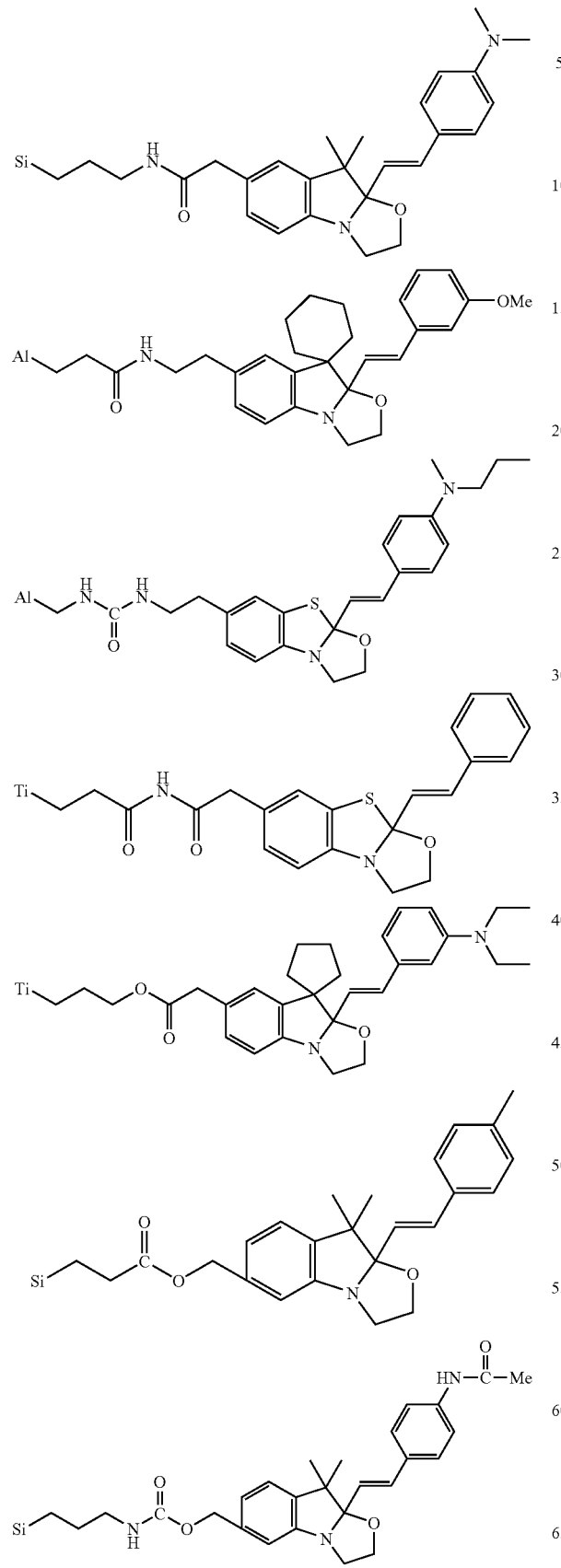
-continued
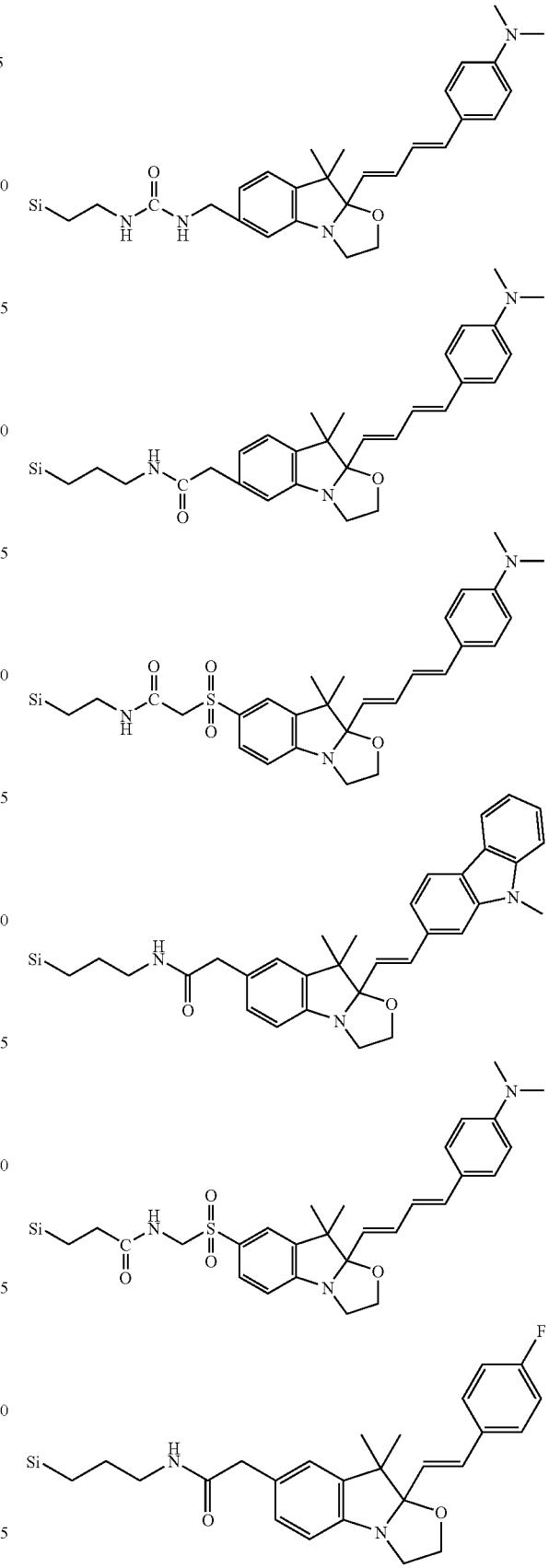

-continued

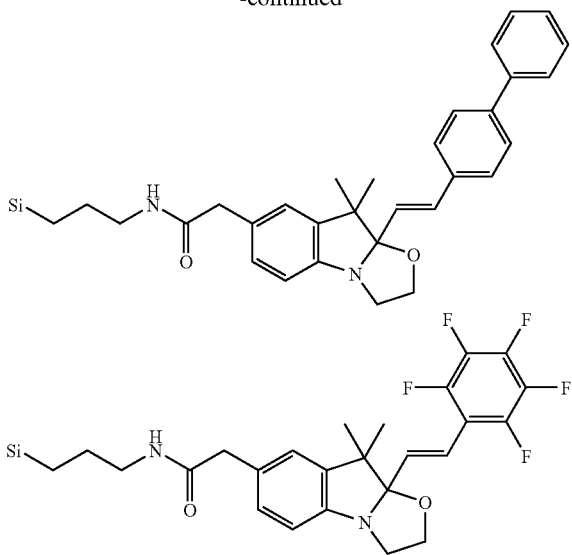

In Chemical Formula (7), Ti, Si, and Al are bonded to corresponding metal oxides.

Examples of metal oxide particles which are used in the embodiments of the present invention are described below. Main components of the metal oxide particles are formed of, for example, titanium oxide, zinc oxide, tin oxide, alumina, zirconia, ceria, silica, yttria, boronia, magnesia, strontium titanate, postassium titanate, barium titanate, calcium titanate, calcia, magnesium oxide, indium oxide, tungsten oxide, ferrite, hafnia, tungsten trioxide, ferric oxide, copper oxide, nickel oxide, cobalt oxide, barium oxide, strontium oxide, vanadium oxide, barium titanate, calcium phosphate, and alumino silicate. As the main components of the metal oxide particles, only one of the above materials can be used, or two or more above materials can be mixed. Preferably, the main components of the metal oxide particles is one selected from the titanium oxide, the zinc oxide, the tin oxide, the alumina, the zirconia, the ferric oxide, the magnesium oxide, the indium oxide, and the tungsten oxide; or an amalgam of the above materials. The titanium oxide is more preferably used as the main components of the metal oxide particles from the viewpoint of the suitable electric and physical characteristics.

A displaying electrode substrate, which is used in a displaying device having the electrochromic displaying elements, is formed of, for example, glass or a plastic film. Especially, when the plastic film is used, a light-weight and flexible displaying device can be formed. A transparent electrode film which is used in a displaying electrode can be formed of an existing transparent electrode film formed of indium oxide, tin oxide, or zinc oxide. However, it is preferable that the transparent electrode film is formed of ITO (indium tin oxide) or FTO (fluorine doped tin oxide) from the viewpoint of a suitable resistance value and transparency.

An electrode corresponding to the displaying electrode is formed of a conductive film on a substrate, for example, of glass or a plastic film. However, it is possible for the substrate to be formed of a metal plate and the substrate itself works as the electrode corresponding to the displaying electrode. It is preferable that the conductive film be formed of ITO or FTO.

As electrolyte which is used in the embodiments of the present invention, an ionic liquid can be used. Any electrolyte which has been generally researched and reported can be used. Especially, since an organic ionic liquid has a molecular structure which maintains the liquid state in a wide temperature range including room temperature, the organic ionic liquid is suitable.

Cationic components in the electrolyte are, for example, aromatic based salt such as imidazole derivatives, for example; N,N-dimethylimidezole salt; N,N-methylethylimidazole salt; N,N-methylpropylimidazole salt; and pyridinium derivatives, for example; N,N-dimethylpyridinium salt; N,N-methylpropylpyridinium salt. Further, the cationic components in the electrolyte are, for example, aliphaticquaternaryammonium based substance, for example, trimethlypropylammonium salt; trimethylhexylammonium salt; triethylhexylammonium salt; and tetraalkylammonium.

Anionic components in the electrolyte are preferred to be a compound including fluorine from the viewpoint of stability in the atmosphere, and can be $BF_4^-$, $CF_3SO_3^-$, $PF_4^-$, and $(CF_3SO_2)_2N^-$.

As the electrolyte, an ionic liquid can be used in which the cationic components and the anionic components are included.

In the embodiments of the present invention, only the ionic liquid can be used as the electrolyte; however, a mediator can be added to the ionic liquid. When the mediator is added to the ionic liquid, the conductivity becomes large and the response can be made high. As the mediator, there are, for example, inorganic ion salt such as alkali metal salt and alkali earth metal salt, quaternary ammonium salt, acid, and alkali. Specifically, as the mediator, for example, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $MG(BF_4)_2$ can be used.

[Manufacturing Method of Reversible Recording Material]

In the manufacturing method of the reversible recording material according to the embodiments of the present invention, metal oxide particles react with a coupling agent shown in Chemical Formula (3), and the reacted substance further reacts with a compound shown in Chemical Formula (4).

[Chemical Formula (3)]

(3)

[Chemical Formula (4)]

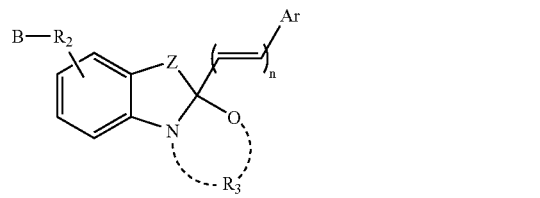

(4)

In Chemical Formulae (3) and (4), M shows a functional group including an element selected from Si, Ti, and Al. As the same as those described in Chemical Formula (1), Z shows a linkage of a methylene group or a sulfide group and can have a substituent group, Ar shows an aromatic group and can have a substituent group, $R_1$ and $R_2$ show corresponding alkylene groups and can have a substituent group, and $R_3$ shows an alkylene group capable of forming a ring structure linked with —N—C—O— and can have a substituent group. In addition, "n" is an integer which is 1 or more. Further, each of A and B independently shows a group selected from an amino group, a carboxyl group, an epoxy group, an isocyanate group, a thioisocyanate group, an amido group, an ester group, an aldehyde group, and a hydroxyl group.

As the coupling agent shown in Chemical Formula (3), there are, for example, 10-undecynildimethylchlorosilane, 11-bromoundecyldimethylchlorosilane, 11-bromoundecylt-rimethoxysilane, 1-chroloethyltrichlorosilane, 2-(3,4-epoxy-cyclohexylethyl)trimethoxysilane, 3-(2,4-dinitropheny-lamino)propyltriethoxysilane, 3-aminopropyltriethoxylsalane, 3-aminopropyltrimethox-ysilane, 3-allylaminopropyltrimethoxysilane, 3-isocyan-atepropyldimethylchlorosilane, 3-isocyanatepropyltriethox-ysilane, 3-isocyanatepropyltrimethoxysilane, trimethoxyvinylsilane, vinyltrichlorosilane, mercaptometh-yltrimethoxysilane, and o-aryloxy(polyethyleneoxy)triiso-propoxytitanium.

Preferable examples of the structure shown in Chemical Formula (4) are shown in Chemical Formulae (8).

[Chemical Formulae (8)]

(8)

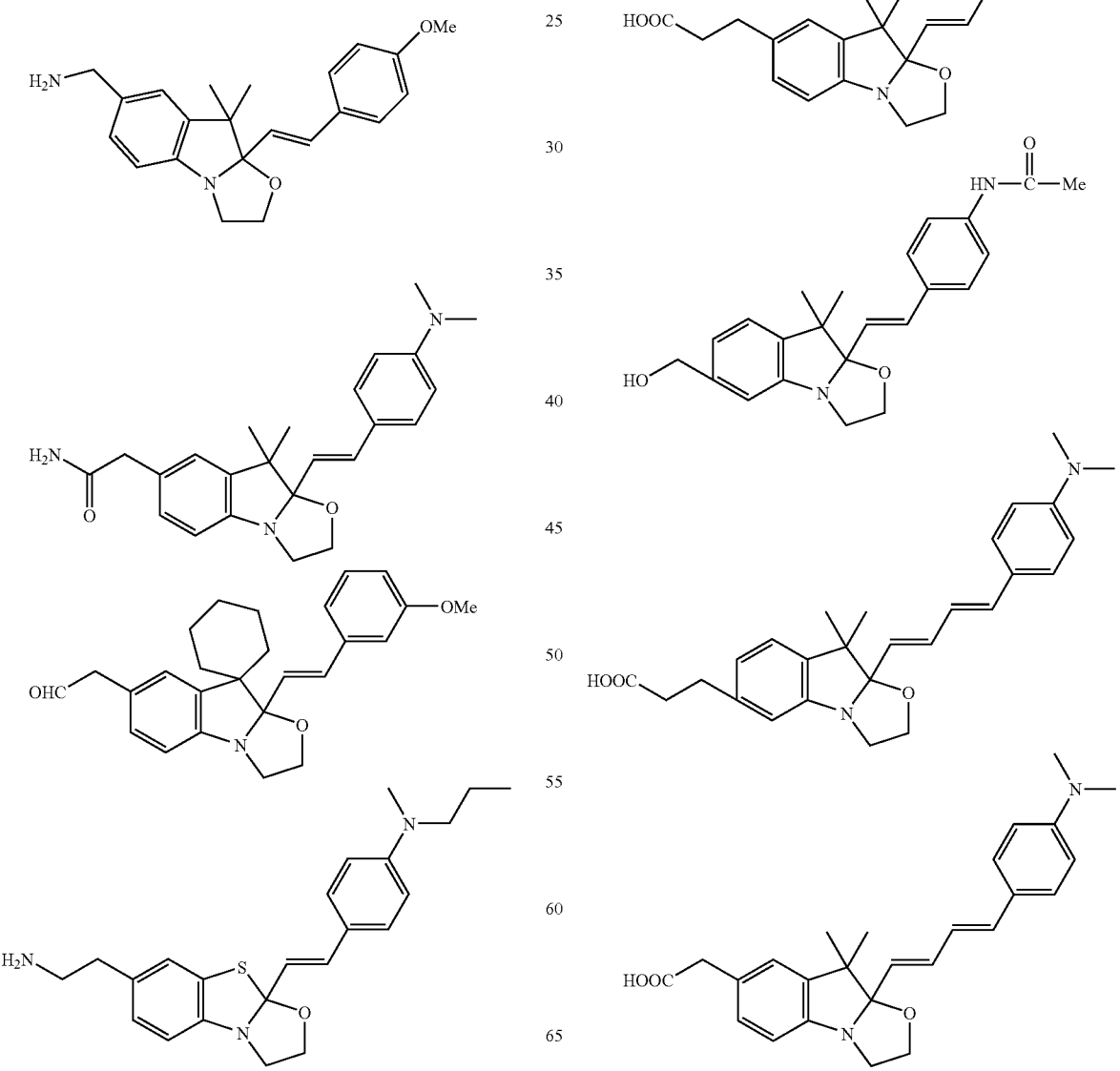

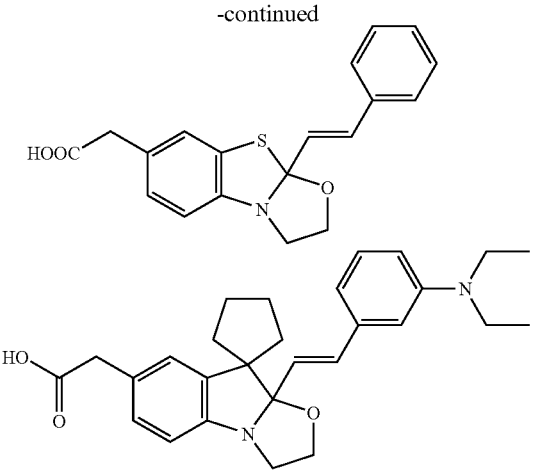

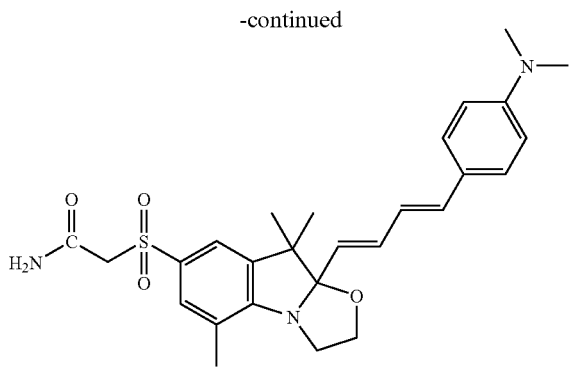
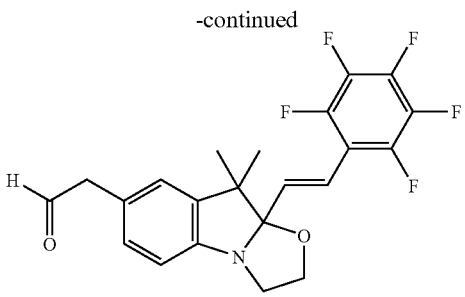

[Electrochromic Displaying Element]

An electrochromic displaying element according to the embodiments of the present invention includes a displaying electrode which includes a transparent substrate having a transparent conductive film, an electrode including a substrate having a conductive film corresponding to the displaying electrode, and an electrolyte layer disposed between the displaying electrode and the electrode corresponding to the displaying electrode. A reversible recording material, which shows electrochromic characteristics, is formed on the displaying electrode at the side of the electrolyte layer. The structure of the other parts are not limited to a specific structure. With this, an electrochromic displaying element having high color developing characteristics can be realized.

In addition, when two or more reversible recording materials having the electrochromic characteristics, whose color development is different from each other, are disposed in an electrochromic displaying element, the electrochromic displaying element can display multiple colors.

Further, when pH of the electrolyte layer is basic, an electrochromic displaying element can be realized in which background color development does not occur.

[Manufacturing Method of Electrochromic Displaying Element]

In a manufacturing method of the electrochromic displaying element according to the embodiments of the present invention, metal oxide particles are formed on a transparent conductive film of a displaying electrode having a transparent substrate including the transparent conductive film, the metal oxide particles react with a coupling agent shown in Chemical Formula (3), and the reacted substance further reacts with a compound shown in Chemical Formula (4). With this, a reversible recording material is formed. Then an electrolyte layer is formed between the displaying electrode and the electrode having the substrate which includes the conductive film corresponding to the displaying electrode. Chemical Formulae 3 and 4 are described above; therefore, the same description is omitted.

Next, the embodiments of the present invention are described. In the embodiments of the present invention, experiments are executed.

FIRST EMBODIMENT

[Forming of Reversible Recording Material]

A material TKS-203 (trademark) produced by TAYCA Co., Ltd. is burned for approximately 1 hour at approximately 450° C. and the burned material is formed into powder (1) by using an agate mortar. The powder (1) of 2 grams is added into a solution in which 3-aminopropyltrimethoxysilane of 1 gram is dissolved in water of 100 grams and the solution is agitated for approximately 24 hours. The agitated solution is filtered, cleaned, and dried. The dried substance is again formed into powder (2) by the agate mortar. The powder (2) of 1 gram is added to tetrahydrofuran of 50 ml. Further, 1-hydroxybenzotriazole of 2.6 grams and N,N'-diisopropylcarbodiimide of 1.3 grams, and a compound shown in Chemical Formula (9), are added to the powder (2) in which the tetrahydrofuran is added. The combined substance is agitated for approximately one hour at approximately 60° C. Then, the agitated substance is filtered, cleaned, and dried. With this, a reversible recording material (1) is obtained.

[Chemical Formula (9)]

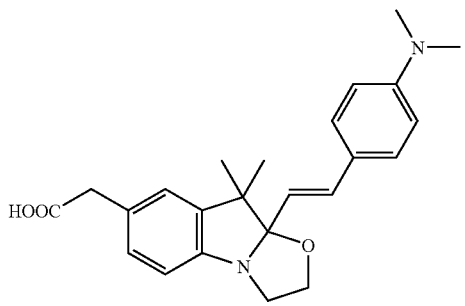

(9)

Further, the powder of the reversible recording material (1) is dispersed in a polyvinyl alcohol solution of 5% by weight per the total weight of the solution and applied onto normal paper. With this, a reversible recording medium (1) is formed.

COMPARISON EXAMPLE 1

A reversible recording material (2) is formed of Chemical Formula (10).

[Chemical Formula (10)]

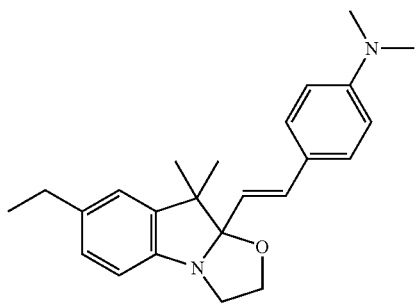

(10)

Further, the powder of the reversible recording material (2) is dispersed in the polyvinyl alcohol solution of 5% by weight per the total weight of the solution and applied onto normal paper. With this, a reversible recording medium (2) is formed.

[Color Development and Reduction Test (Initial Color Development Characteristics)]

Both the reversible recording media (1) and (2) develop color when a 0.1 N hydrochloric acid aqueous solution is dropped on the media, and become color reduction states when a 0.1 N sodium hydroxide aqueous solution is dropped on the media.

[Durability Test (Color Development Characteristics with Passage of Time)]

The reversible recording media (1) and (2) are soaked in an aqueous solution for approximately one hour, then the taken out media (1) and (2) are left as they are for approximately one week, and the color development test described above is executed. The reversible recording medium (1) shows color development similar to that shown in the color development test (initial color development characteristics). However, the reversible recording medium (2) in the comparison example 1 hardly shows color development even if the 0.1 N hydrochloric acid aqueous solution is dropped on the medium.

SECOND EMBODIMENT

[Forming of Reversible Recording Material]

A material TKS-203 (trademark) produced by TAYCA Co., Ltd. is burned for approximately 1 hour at approximately 450° C. and the burned material is formed into powder (1) by using an agate mortar. The powder (1) of 2 grams is added into a solution in which 3-aminopropyltrimethoxysilane of 1 gram is dissolved in water of 100 grams and the solution is agitated for approximately 24 hours. The agitated solution is filtered, cleaned, and dried. The dried substance is again formed into powder (2) by the agate mortar. The powder (2) of 1 gram is added to tetrahydrofuran of 50 ml. Further, 1-hydroxybenzotriazole of 2.6 grams and N,N'-diisopropylcarbodiimide of 1.3 grams, and a compound shown in Chemical Formula (11), are added to the powder (2) in which the tetrahydrofuran is added. The combined substance is agitated for approximately 1 hour at approximately 60° C. Then, the agitated substance is filtered, cleaned, and dried. With this, a reversible recording material (3) is obtained.

[Chemical Formula (11)]

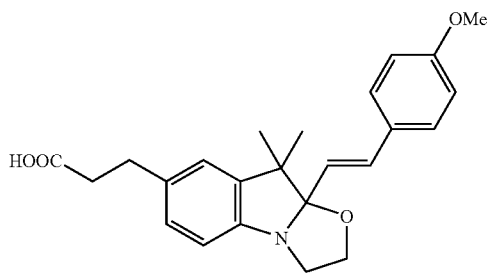

(11)

[Forming of Displaying Electrode]

The powder (3) is dispersed in alcohol and the dispersed powder is applied onto a part (area of 1 cm$^2$) of a glass substrate on whose entire surface a tin oxide transparent electrode film is formed by using a spin coating method, and the substrate with powder applied is heated for approximately one hour at approximately 100° C. With this, a displaying electrode is formed in which a reversible recording material layer of approximately 2 μm thickness is formed.

[Forming of Electrode Corresponding to Displaying Electrode]

Titanium oxide particles whose primary particle size is 300 nm of 50 grams (material CR-50 (trademark) produced by ISHIHARA SANGYO KAISYA, Ltd.) and a 50% MEK (methyl ethyl ketone) solution of polyester resin (M-8076 (trademark) produced by Dainippon Ink and Chemical Inc.) of 1 gram are dispersed in a tetrahydrofuran solution of 10 ml. The dispersed solution is applied onto all surfaces of a zinc plate of 0.2 mm thickness by using a wire bar and the zinc plate is dried. With this, an electrode corresponding to the displaying electrode is formed. The electrode corresponding to the displaying electrode is formed with the thickness of approximately 5 μm and shows white similar to paper.

[Forming of Electrochromic Displaying Element]

The displaying electrode and the electrode corresponding to the displaying electrode are adhered with a spacer of approximately 50 μm thickness between them and a cell is formed. An electrolyte solution is formed in which lithium perchlorate of 0.2 M is dissolved in a propylene carbonate solution, and the electrolyte solution is sealed into the cell. With this, an electrochromic displaying element is formed.

THIRD EMBODIMENT

[Forming of Displaying Electrode]

A titanium oxide fine particle dispersed liquid (material TKS-203 (trademark) produced by TAYCA Co., Ltd.) is applied onto a part (area of 1 cm$^2$) of a glass substrate on whose entire surface a tin oxide transparent electrode film is formed by using a spin coating method, and the substrate with particles applied is heated for approximately one hour at approximately 450° C. With this, a titanium oxide layer of approximately 2 μm thickness is formed. Further, the electrode having the titanium oxide layer is soaked in a tetrahydrofuran solution of approximately 100 ml. Further, 1-hydroxybenzotriazole of approximately 2.6 grams, N,N'-diisopropylcarbodiimide of approximately 1.3 grams, and the compound shown in Chemical Formula (11) are added to the solution and agitated for approximately one hour at approximately 60° C. After this, the electrode is cleaned and dried. With this, a displaying electrode is formed. Since Chemical Formula (11) is described above, the same description is omitted.

[Forming of Electrode corresponding to Displaying Electrode]

An electrode corresponding to the displaying electrode is formed by the same as that in the second embodiment. Therefore, the same description is omitted.

[Forming of Electrochromic Displaying Element]

An electrochromic displaying element is formed by the same as that in the second embodiment. Therefore, the same description is omitted.

COMPARISON EXAMPLE 2

In a comparison example 2, a displaying electrode is formed as described below. The others are formed by the same as those in the second embodiment. Therefore, only a forming method of the displaying electrode is described.

[Forming of Displaying Electrode]

A compound shown in Chemical Formula (12) is dissolved in chloroform and a 0.02 M organic electrochromic compound solution (1) is formed.

[Chemical Formula (12)] (12)

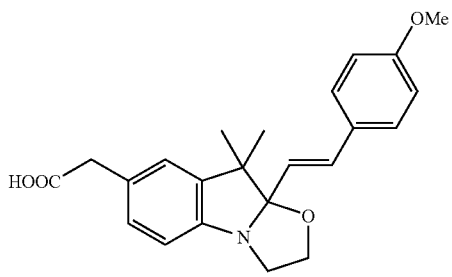

A titanium oxide fine particle dispersed liquid (material TKS-203 (trademark) produced by TAYCA Co., Ltd.) is applied onto a part (area of 1 cm$^2$) of a glass substrate on whose entire surface a tin oxide transparent electrode film is formed by using a spin coating method, and the substrate with particles applied is heated for approximately one hour at approximately 450° C. With this, an electrode having the tin oxide layer of approximately 2 μm is formed. Then the electrode having the tin oxide layer is soaked in the 0.02 M organic electrochromic compound solution (1) for approximately 24 hours. After this, the soaked electrode is cleaned and dried. With this, a displaying electrode is formed.

COMPARISON EXAMPLE 3

In a comparison example 3, a displaying electrode is formed as described below. The others are formed by the same methods as those in the second embodiment. Therefore, only a forming method of the displaying electrode is described.

[Forming of Displaying Electrode]

A compound shown in Chemical Formula (13) is dissolved in chloroform and a 0.02 M organic electrochromic compound solution (2) is formed.

[Chemical Formula (13)] (13)

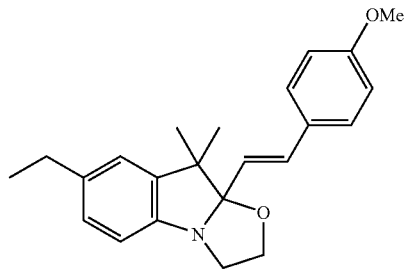

A liquid with titanium oxide fine particles dispersed (material TKS-203 (trademark) produced by TAYCA Co., Ltd.) is applied onto a part (area of 1 cm$^2$) of a glass substrate on whose entire surface a tin oxide transparent electrode film is formed by using a spin coating method, the substrate with particles applied is heated for approximately one hour at approximately 450° C., and a titanium oxide layer of approximately 2 μm thickness is formed. Then the electrode having the tin oxide layer is soaked in the 0.02 M organic electrochromic compound solution (2) for approximately 24 hours. After this, the soaked electrode is cleaned and dried. With this, a displaying electrode is formed.

[Color Development and Reduction Test (Initial Color Development Characteristics)]

Color development and reduction of the electrochromic displaying elements are measured by a spectroscopic color measuring instrument LCD-5000 (trademark) manufactured by OTSUKA ELECTRONICS Co., Ltd. by radiating diffusion light. A voltage is applied to the electrochromic displaying elements by using a function generator FG-02 (trademark) manufactured by TOHO GIKEN Co., Ltd.

As results of the measurements, when reflectance is measured under non-application of a voltage, the reflectance of all the electrochromic displaying elements shows a high value of approximately 60%. When a voltage of 2 V is applied to the electrochromic displaying elements by connecting positive potential to the displaying electrode and negative potential to the electrode corresponding to the displaying electrode, a yellow color is developed. When a voltage of −2 V is sufficiently applied, the yellow color is reduced and turned to white.

[Durability Test (Color Development Characteristics with Passage of Time)]

One week after manufacturing the electrochromic displaying elements, a durability test is executed by observing a white reflection layer in a color development and reduction test similar to the above. The white reflection layer is formed at a position near the electrode corresponding to the displaying electrode between the displaying electrode and the electrode corresponding to the displaying electrode. By forming the white reflection layer, when a voltage is not applied to the electrochromic displaying element, the electrochromic displaying element reflects light from the outside and displays white; that is, the electrochromic displaying element becomes a state near white paper.

The durability test is evaluated by an evaluation criterion described below and the evaluated result is shown in Table 1.

[Evaluation Criterion]

○: only a part of the fine particle layer of the displaying electrode develops a yellow color Δ: the above part and other than the above part of the fine particle layer of the displaying electrode develop a yellow color x: a color is hardly developed

TABLE 1

| | COLOR DEVELOPMENT & REDUCTION TEST | | DURABILITY TEST | |
|---|---|---|---|---|
| | COLOR DEVELOPMENT CHARACTERISTICS | REFLECTANCE | COLOR DEVELOPMENT CHARACTERISTICS | REFLECTANCE |
| 2ND EMBODIMENT | ○ | 13% | ○ | 14% |
| 3RD EMBODIMENT | ○ | 14% | ○ | 14% |
| COMPARISON EXAMPLE 2 | Δ | 20% | X | 35% |
| COMPARISON EXAMPLE 3 | Δ | 24% | X | 40% |

In Table 1, the first embodiment and the comparison example 1 form only the corresponding reversible recording media and do not form the corresponding electrochromic displaying elements; therefore, the results of the first embodiment of the present invention and the comparison example 1 are not shown.

In addition, in Table 1, the value of the reflectance is lower than that under the non-application of a voltage. That is, when a voltage is applied to the electrochromic displaying element, color is developed; therefore, the reflectance is lowered. In other words, when the reflectance at the time of the color development is low, the color development characteristics become high.

Further, the present invention is not limited to the specifically disclosed embodiments, and variations and modifications may be made without departing from the scope of the present invention.

The present invention is based on Japanese Priority Patent Application No. 2006-305149, filed on Nov. 10, 2006, with the Japanese Patent Office, the entire contents of which are hereby incorporated herein by reference.

What is claimed is:

1. A manufacturing method of an electrochromic displaying element, comprising:
   a step in which a metal oxide particle layer is formed on a transparent conductive film of a displaying electrode having a transparent substrate including the transparent conductive film;
   a step in which metal oxide particles in the metal oxide particle layer react with a coupling agent shown in Chemical Formula (3);
   a step in which a reversible recording material is formed so that the above reacted substance further reacts with a compound shown in Chemical Formula (4);
   a step in which an electrode having a substrate including a conductive film corresponding to the displaying electrode is formed; and
   a step in which an electrolyte layer is formed between the displaying electrode and the electrode corresponding to the displaying electrode; wherein

[Chemical Formula (3)]

$$M-R_1-A \qquad (3)$$

[Chemical Formula (4)]

(4)

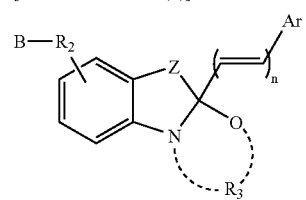

in Chemical Formulae (3) and (4), M shows a functional group including an element selected from Si, Ti, and Al; Z shows a linkage of a methylene group or a sulfide group capable of having a substituent group; Ar shows an aromatic group capable of having a substituent group; $R_1$ and $R_2$ show corresponding alkylene groups capable of having a substituent group; $R_3$ shows an alkylene group capable of forming a ring structure linked with —N—C—O— and able to have a substituent group; "n" is an integer which is 1 or more; and each of A and B independently shows a functional group selected from an amino group, a carboxyl group, an epoxy group, an isocyanate group, a thioisocyanate group, an amido group, an ester group, an aldehyde group, and a hydroxyl group.

2. The method of claim 1, wherein the coupling agent of Chemical Formula (3) is a member selected from the group consisting of 10-undecynildimethylchlorosilane, 11-bromoundecyldimethylchlorosilane, 11-bromoundecyltrimethoxysilane, 1-chroloethyltrichlorosilane, 2-(3,4-epoxycyclohexylethyl)trimethoxysilane, 3-(2,4-dinitrophenylamino)propyltriethoxysilane, 3-aminopropyltriethoxylsilane, 3-aminopropyltrimethoxysilane, 3-allylaminopropyltrimethoxysilane, 3-isocyanatepropyldimethylehiorosilane, 3-isocyanatepropyltriethoxysilane, 3-isocyanatepropyltrimethoxysilane, trimethoxyvinylsilane, vinyltrichiorosilane, mercaptomethyltrimethoxysilane, and o-aryloxy(polyethyleneoxy)triisopropoxytitanium.

3. The method of claim 1, wherein the compound of Chemical Formula (4) is a member selected from the following formulae:

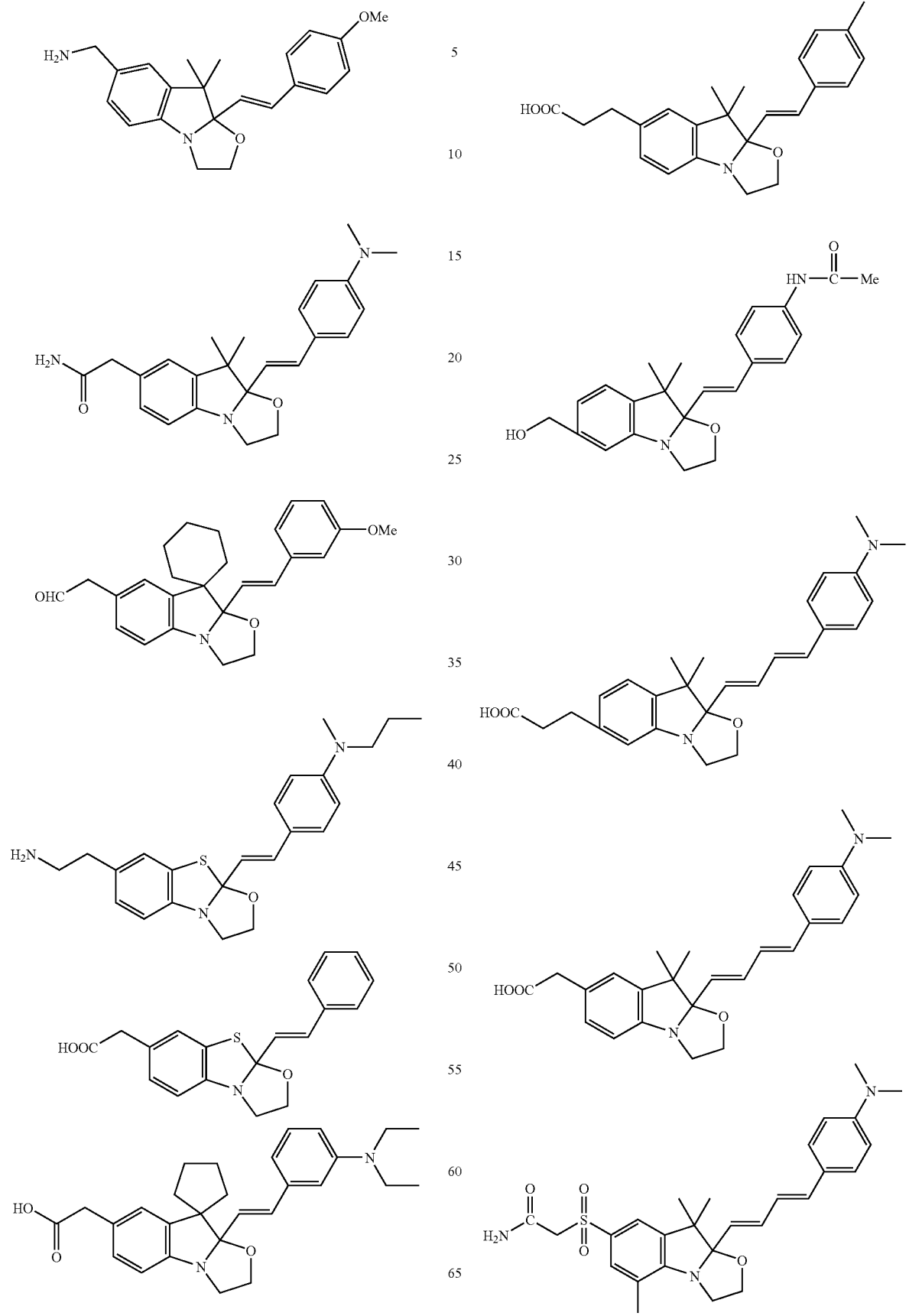

-continued

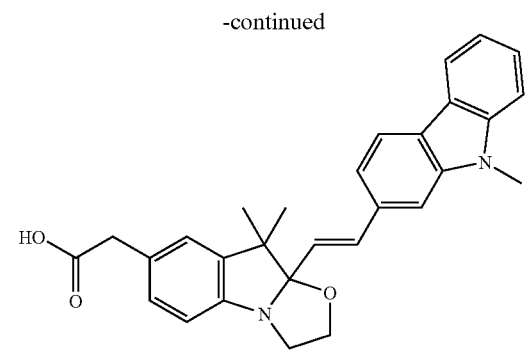

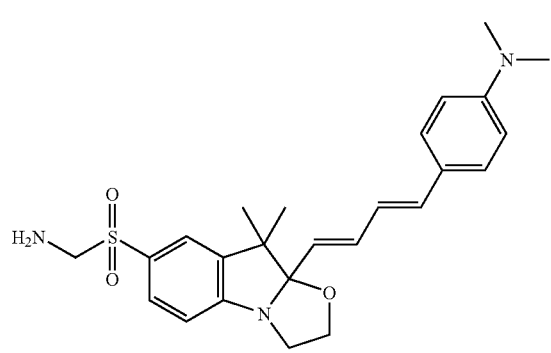

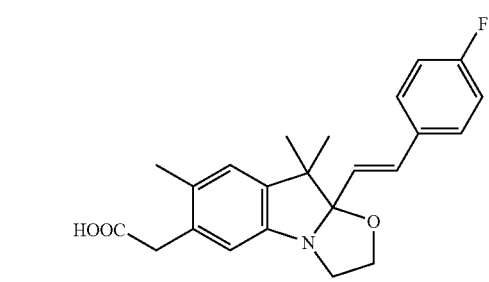

-continued

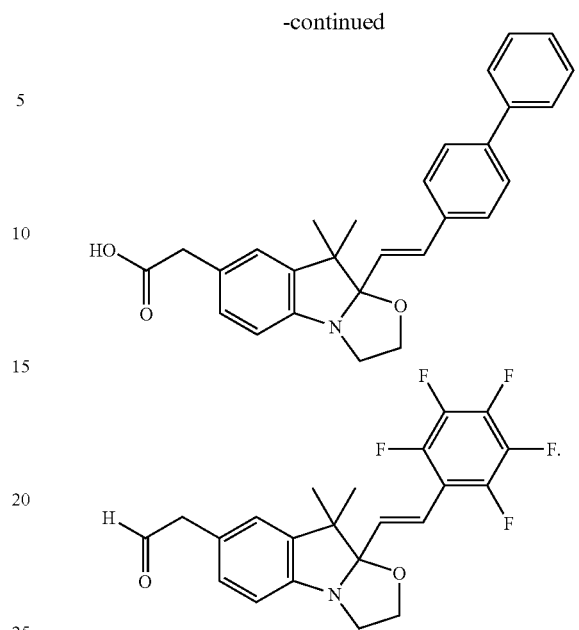

4. The method of claim 1, wherein the metal oxide particles are particles of at least one metal oxide selected from the group consisting of titanium oxide, zinc oxide, tin oxide, alumina, zirconia, ceria, silica, yttria, boronia, magnesia, strontium titanate, postassium titanate, barium titanate, calcium titanate, calcia, magnesium oxide, indium oxide, tungsten oxide, ferrite, hafnia, tungsten trioxide, ferric oxide, copper oxide, nickel oxide, cobalt oxide, barium oxide, strontium oxide, vanadium oxide, barium titanate, calcium phosphate, alumino silicate and mixtures thereof.

5. The method of claim 4, wherein the metal oxide particles are particles of at least one metal oxide selected form the group consisting of titanium oxide, zinc oxide, tin oxide, alumina, zirconia, ferric oxide, magnesium oxide, indium oxide, tungsten oxide and mixtures thereof.

6. The method of claim 5, wherein the metal oxide particles are titanium oxide particles.

7. The method of claim 1, wherein the transparent conductive film comprises indium oxide, tin oxide, zinc oxide, indium tin oxide (ITO) or fluorine doped tin oxide (FTO).

8. The method of claim 1, wherein the transparent substrate comprises glass or a plastic film.

\* \* \* \* \*